Fig. I.

INVENTOR
LELAND E. ASHMAN
ATTORNEY

Nov. 18, 1969  L. E. ASHMAN  3,479,167
APPARATUS FOR MAKING GLASS FIBERS
Filed May 2, 1966  5 Sheets-Sheet 5

INVENTOR
LELAND E. ASHMAN
BY
ATTORNEY

United States Patent Office 3,479,167
Patented Nov. 18, 1969

3,479,167
APPARATUS FOR MAKING GLASS FIBERS
Leland E. Ashman, Belmont, Mass., assignor to Arthur D. Little Inc., Cambridge, Mass., a corporation of Massachusetts
Filed May 2, 1966, Ser. No. 546,706
Int. Cl. C03b 37/02
U.S. Cl. 65—1                                                 4 Claims

ABSTRACT OF THE DISCLOSURE

A constant feed of glass marbles is furnished by a rotary feeder to a heated low capacity pre-melter with funnel shaped conical rapid melting cups thereby minimizing holdup of the marbles at the feeder. The melted glass is discharged from the pre-melter cups into a bushing which is heated separately from and independently of the pre-melter. Additionally, the level of the melted glass in the heated bushing may be controlled by a pair of safety probes in the bushing, to give warning if the level of glass is too low and to shut down the feeder and pre-melter if the level is too high.

---

Figure 1:
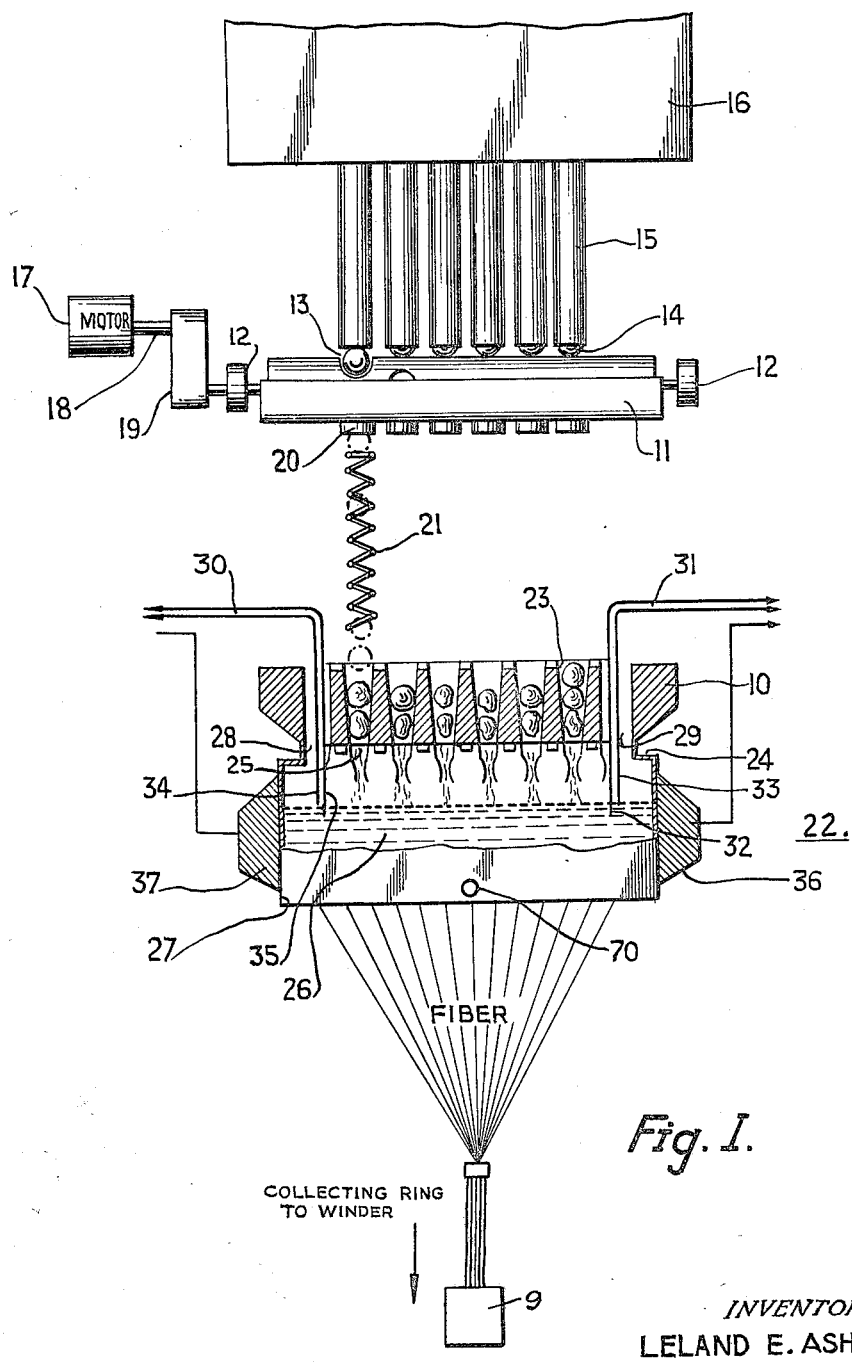

This invention relates to a method and apparatus for processing heat-softenable materials, for example, glass.

In the formation of the product known as Fiberglas, marbles made of glass of suitable composition and formulation are melted and fed into a reservoir or container in the nature of a heated platinum bushing, which is provided with a multiplicity of outlets of the order of 200 or more, from which the molten glass is extruded and attenuated into an equal number of fine filamentary streams. These streams of filamentary material, and/or filaments, are subsequently or thereupon gathered together to form what is known as a strand of filaments, and such strand is wound spirally on a mandrel for storage and/or later further processing into textile materials such as woven or unwoven cloth or other fabrication of intermediate or end products.

One difficulty or problem frequently and commonly encountered in the manufacture of such glass strands is that of variations occurring in the viscosity of the heat-softened glass mix in the feeder or bushing, with attendant and corresponding variations in the flow rate of the molten glass through the bushing outlets. Consequently there is non-uniformity of filament, size, and weight in the strand, and in the individual streams of attenuated filamentary glass making up the strand. This non-uniformity, or filament weight variation, which is sometimes referred to as the co-efficient of variation, abbreviated as C.V., may sometimes run as high as 10% or even more as measured in wound packages of the strand.

The present invention contemplates and proposes a method of and apparatus for forming such heat-softenable mineral compositions into Fiberglas filaments and strands characterized by improved uniformity in overall weight of the yardage in packages.

The basic part of a Fiberglas bushing process is the platinum bushing or container fabricated from platinum sheet that provides for heating the glass to a temperature that permits it to flow freely through many tips or orifices that are built into the bottom plate of the bushing. A typical bushing has a capacity of approximately 10 pounds of glass and contains 204 tips. As the glass flows through the tips, it is attenuated by winding at high speed on spools.

Specifications on Fiberglas frequently require it to be uniform in weight per unit length and therefore it is important that the mass rate of flow of glass from the bushing be uniform or held within the limits required by the specifications. For a given orifice size, the mass flow of glass will depend upon (1) the viscosity and (2) the height of glass (or pressure head) in the bushing and therefore it would appear that the uniformity of fiber depends, in addition to a constant pulling speed, upon the degree of control over the viscosity and level of glass in the bushing. This control problem is complicated by the requirement that glass must be introduced into the bushing as fast as it flows out. Raw glass in the form of marbles, normally is melted in a premelter in the form of a basket located in the upper half of the bushing. As the marbles melt, the fluid glass flows through small holes in the basket down into the lower part of the bushing, where it may pass through the tips and be attenuated into fiber. In this conventional process, the long term uniformity of the fiber product depends upon the marble melting rate while the short term uniformity depends upon the uniformity of the melt viscosity and level. These considerations are true whether the premelter is located inside of the bushing or is mounted as a separately powered unit outside the bushing. To summarize, the control requirements of the production of a uniform Fiberglas product are:

(1) The output of the premelter must have long term uniformity. In other words, the flow of glass out of the premelter may vary widely as measured from minute to minute, but on an hour to hour basis it should be constant.

(2) The viscosity and glass level in the bushing must have short term uniformity. They are permitted to change from hour to hour but should be constant as measured on a minute to minute basis.

The uniformity of the fiber product (assuming a constant pulling speed) will depend upon how well the above control requirements can be met.

Figure 2:
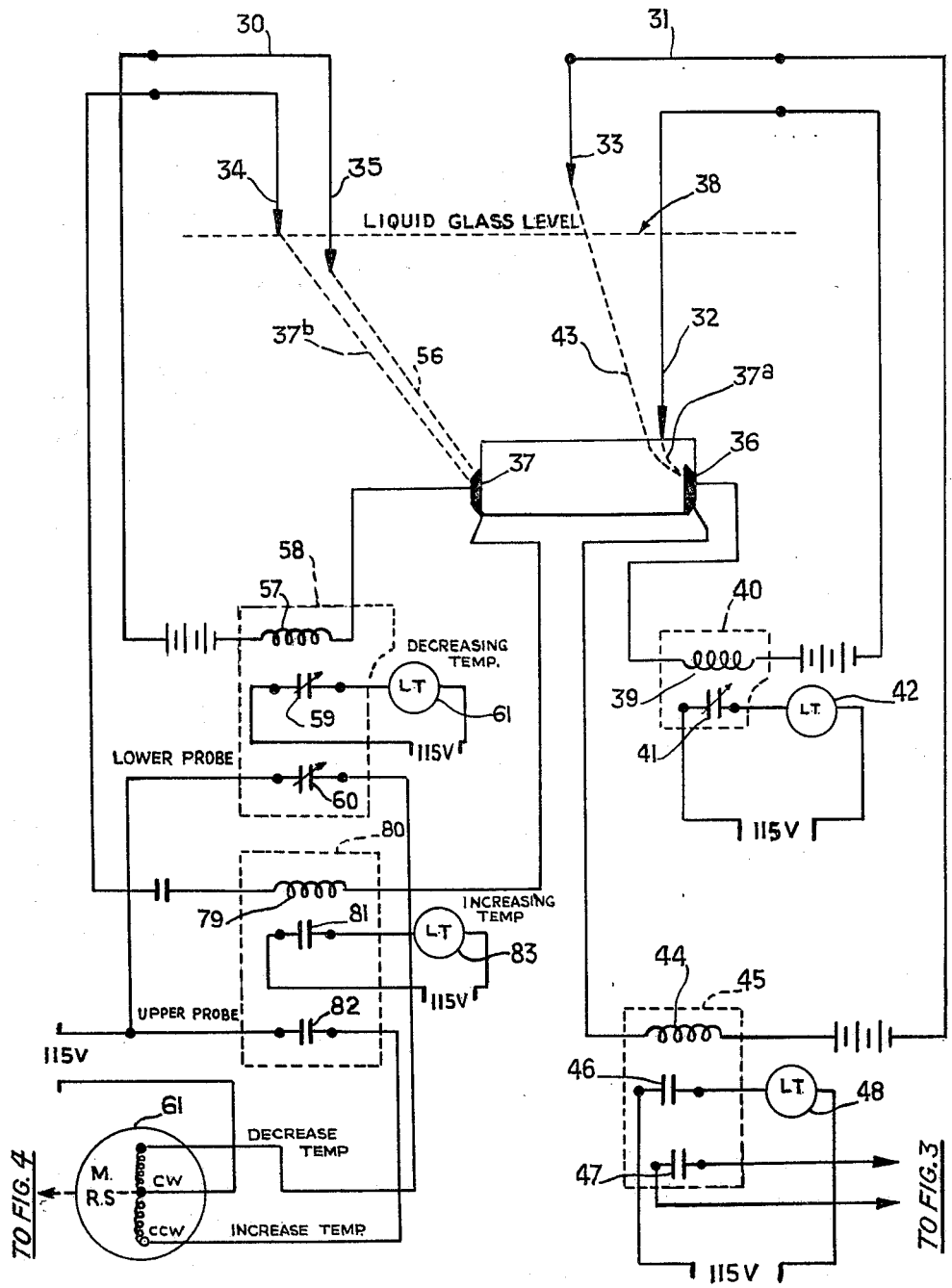
Figure 3:
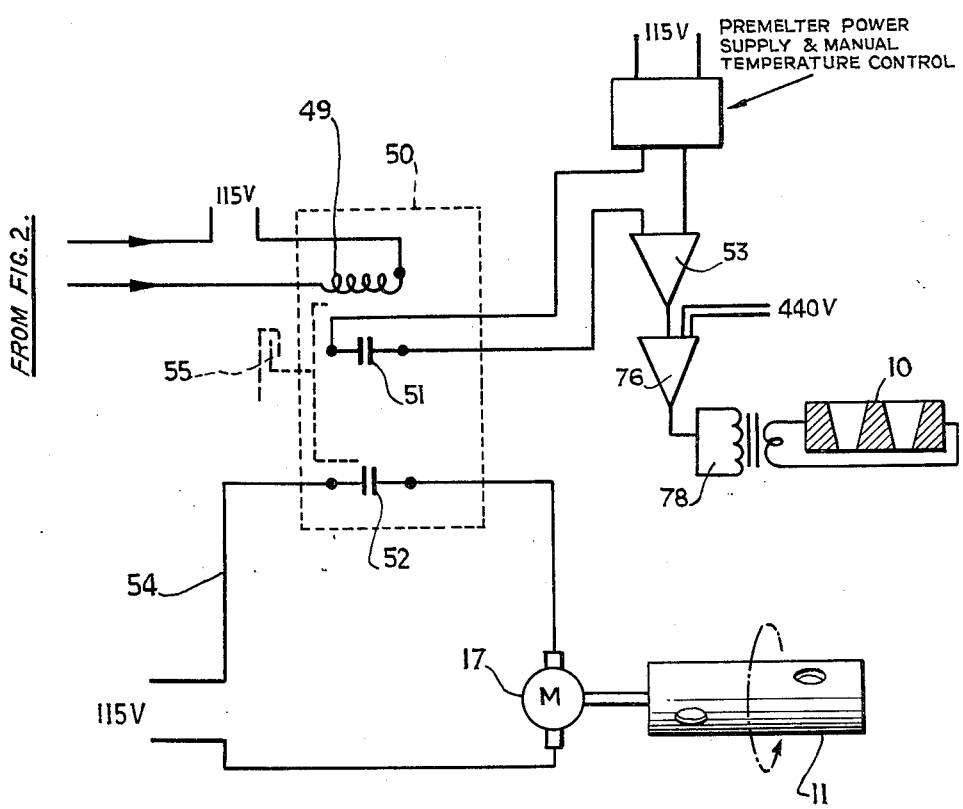
Figure 4:
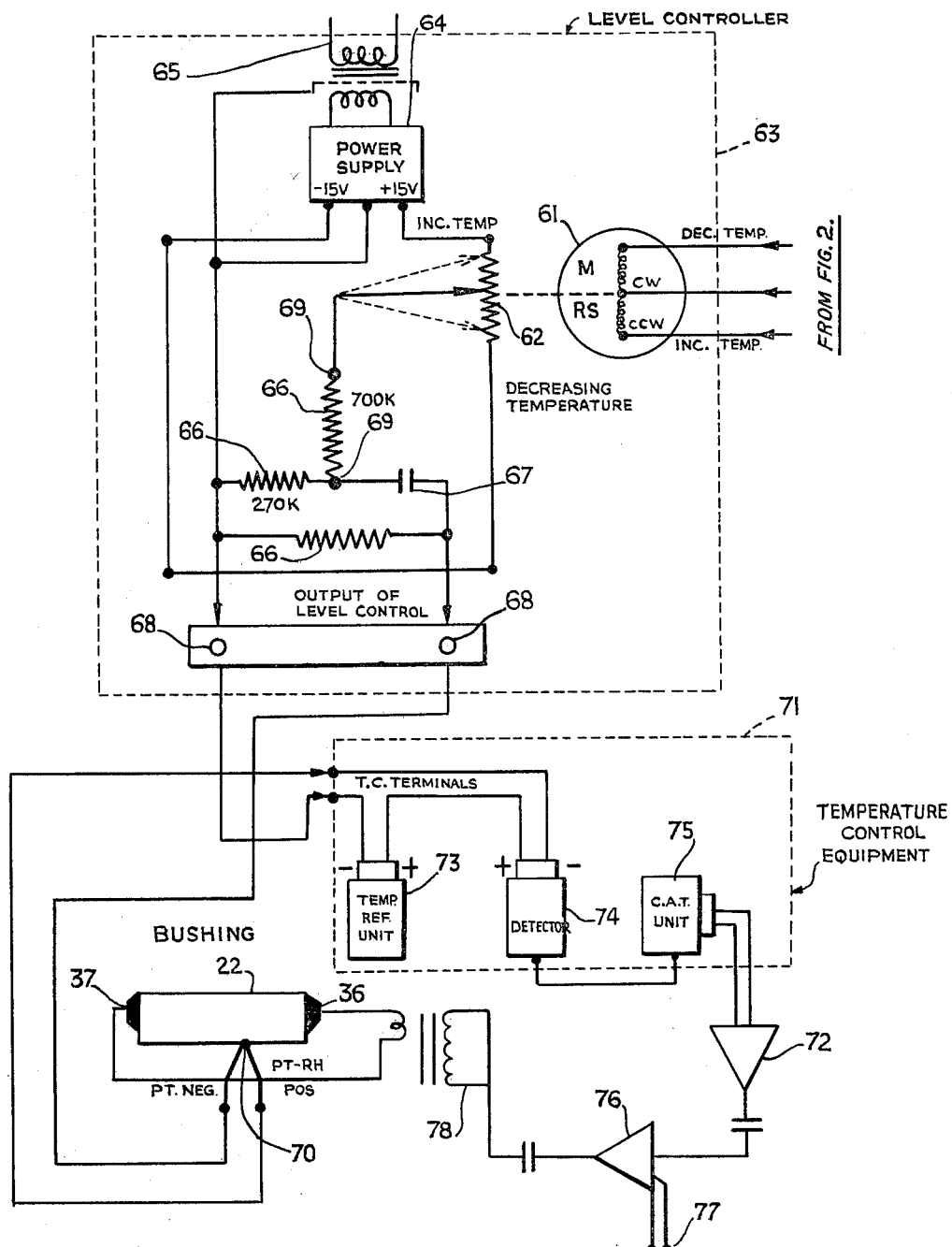
Figure 5:
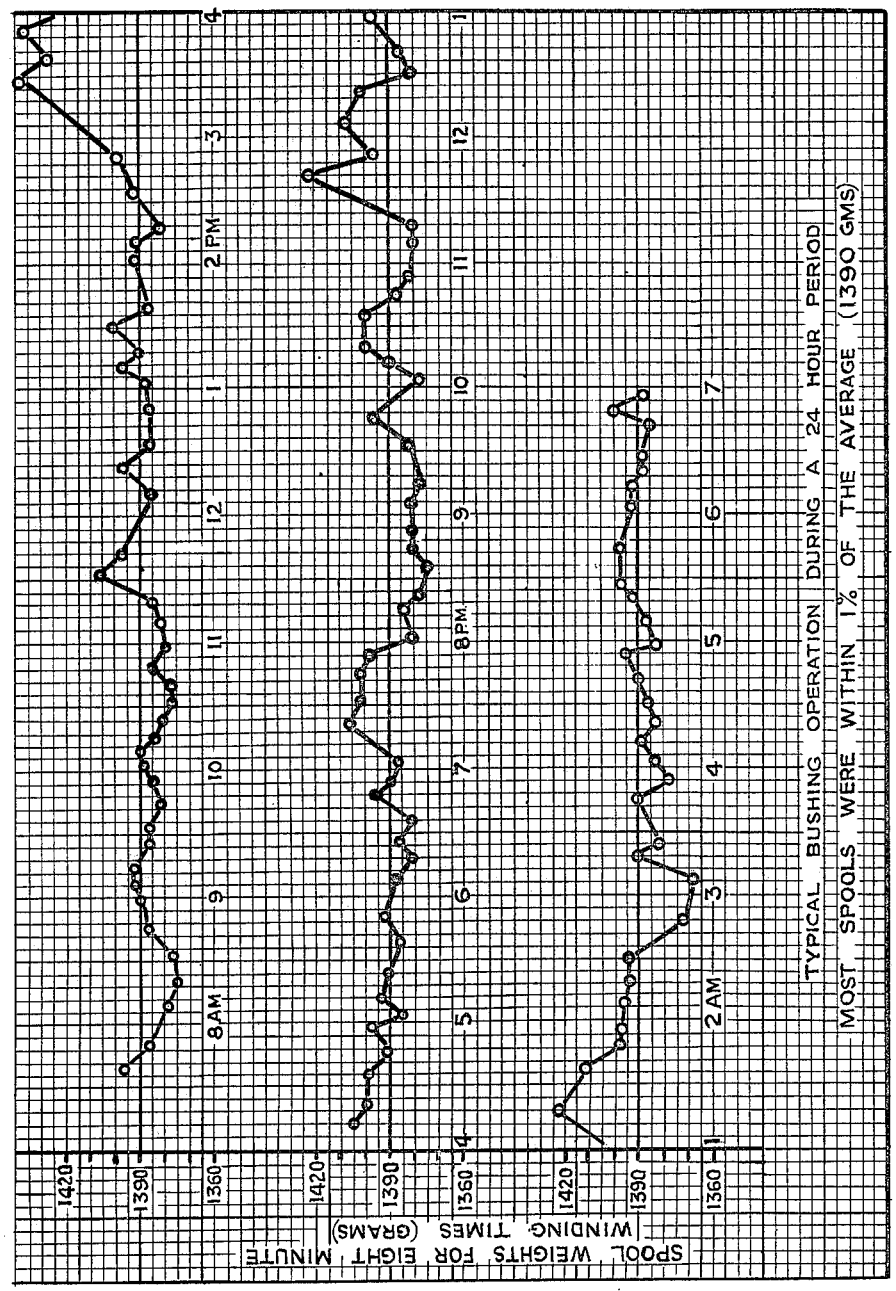

With the above and other objects in view, as will be apparent, the present invention consists in the constructions, combination, and arrangements of parts and/or steps, all as hereinafter more fully described, claimed and illustrated in the accompanying drawings wherein:

FIG. 1 is a front view, partly in section, of a fiber forming apparatus according to the invention comprising a glass marble supply with a controlled feed, a premelter unit, a filament extruding bushing adapted to coact with the premelter and provided with both level and safety controls, and a filament collector or ring for passing the extruded filaments in strand form from the bushing to a suitable winder or mandrel 9;

FIGS. 2, 3 and 4 are schematic wiring diagrams illustrating the circuits of the apparatus of FIG. 1; and FIG. 5 is a graph chart exemplifying within a 24 hour period the improved uniformity of filaments and strand packages obtained by the apparatus and method of the present invention.

According to the invention, glass marbles are fed from a convenient supply into a premelter at a predetermined controlled rate.

The premelter preferably is powered separately from the fiber forming bushing into which it discharges the molten glass, and is provided with a plurality of outlets for the melted glass and mounting wells or passages for the level and safety controls that communicate with the liquid contents of the bushing.

The bushing proper comprises a series of spaced inlet ports disposed in its top plate, which ports or inlets are in registration or alignment with the corresponding outlets in the bottom portion of the premelter. It is also provided with access means for entry into the interior of the bushing by the level and safety controls that are useful in establishing the best operating conditions of the apparatus as hereinafter described.

Referring now to the drawings, the figures thereof illustrate suitable apparatus for the production of Fiberglas filaments and strands of improved uniformity of size and weight and of substantially reduced co-efficient of variation, within the meaning and scope of that term as described in the ASTM Manual on Quality Control of Materials prepared by Committee E–11, published January 1951, at pages 15 et seq. The method and apparatus of the invention are therefore useful in furnishing better strand packages from which improved by-products are fabricated, especially in the fields of decorative and industrial woven and non-woven fabrics, and in allied fields.

In the embodiments here shown, means are provided for feeding glass marbles into a premelter 10 at a known rate of feed. Such may comprise a solid steel rod 11 suitably mounted on bearings 12 for rotation about its longitudinal axis. A plurality of recesses or cavities 13 are uniformly spaced along the length of the rod or cylinder 11 to pick up or receive preformed glass marbles 14 which may be fed by gravity feed from a series of spaced tubes 15, the upper portions or reaches of which are in communication with a relatively large glass marble bin 16. The marble carrying rod 11 may be conveniently rotated at a controlled rate of rotation as by means of a synchronous motor 17 having a central shaft 18 which is constructed and arranged to coact with a gear box 19 that in turn is connected to and controls rotation of the marble feeder and counter rod 11. The rate of marble feed is therefore precisely controlled by means of the synchronous motor 17 and gear box 19. If desired, a set of interchangeable gears permits wide variations in the feed rate, or slight variations therein, depending upon the requirements or specifications of the fiber size, and pulling speed.

The premelter 10, as above indicated, is separately powered from the fiber forming bushing, and is designed to melt the marbles 13 rapidly, permitting very little hold up between the release of the marbles 13 from the mouth or exit ports 20 of the marble feeder and counter 11 and their passage through the marble guides 21 into the premelter 10 and their introduction, as molten glass, into the bushing 22. The premelter 10 also may comprise a plurality of funnel shaped conical melting cups 23 that are heated by direct passage of current. Electric power is supplied through terminals in a manner similar to that of the bushing heating system. The temperature of the marbles is adjusted so that the marbles receive just enough heat to melt them and to maintain a steady flow of glass at the desired rate of flow. Thus the premelter satisfies the requirement of long term uniformity in that the hour to hour output of the premelter cannot vary by more than a few marbles.

The premelter 10 is therefore designed to permit fast melting rate and low capacity to minimize the hold up of marbles between the marble feeder and bushing. For example, the capacity of the premelter 10 is about 18 marbles of standard size, that is, from about ⅝″ to about ¾″ diameter, as compared with perhaps 4 to 5 times that number required to achieve comparable melting rates in the conventional heater basket. The present high melting rates are achieved by forcing the marbles to contact hot platinum over as large an area as possible. Thus the conical design of the melting cups 23. The virtue of the low capacity of the premelter 10 is to minimize the effects of variations in the melting rate of the premelter 10 that could result in relatively large changes in the level of glass in the bushing 22 and in turn relatively large variations in the package weights.

The top surface or plate 24 of the bushing 22 is perforated at spaced intervals 25 to permit discharge of the melted glass composition 26 into an interior chamber or reservoir portion 27 of the bushing 22 from the several premelting channels or cups 23.

The bushing plate 24 may be perforated additionally at 28 and 29 to provide entry to the inner chamber 27 for the level and safety probes 30 and 31, respectively. The purposes and objects of the level controls 30 and 31 are fourfold, viz.: (a) to insure a high level of glass in the bushing, which insures that small level changes will not greatly influence the output of the bushing, (b) to assist during start up in finding the proper operating temperature, (c) to remove the possibility of the glass level rising above the top of the bushing, and (d) to provide a warning that package weights are outside of the weight limits demanded by the specifications governing the fiber forming and strand packaging. These objects are obtained by means of the present bushing which is provided with a level control that maintains the level of the molten glass to within ±.06 inch of a predetermined setting.

The two probes 30, 31, each consisting of two platinum wires, serve to perform the functions mentioned above. In the case of the safety probe 31, one of the wire ends 32 is located half way down the bushing, while the other wire end 33 is located near the top of the bushing. In the case of the lever control probe 30, the ends 34, 35 of the two wires are about ⅛″ apart and located about 3½″ from the bottom of the bushing. When any of these probe ends 31–35 are in contact with the glass 26, a circuit is closed from the probe through the glass to contact at the platinum terminals 36, 37 of the bushing.

In the base of the safety probe 31, when glass level 26 is below the lowest wire 32 a light located on the control panel is on indicating that the level is too low. When contact is made a relay is actuated that turns the light out. On the other hand, if the glass level is so high that it makes contact with the upper wire 33, a light that is normally out comes on to warn that the level is too high. Corresponding to the high level light turning on, the marble feed and the power to the premelter are shut off. The level must then fall and normal operation of the premelter restored by pressing a reset button.

The level probe 30 functions in a somewhat similar fashion in that a light is on to indicate that glass is not in contact with the lower wire 35. When contact is made to the lower wire 35, a light turns off indicating the level is above the lower wire. If contact is made to the upper wire 34, a light turns on. Therefore, if both lights are out, the level is between the two wires and in the desired operating range.

The level control 30 automatically holds the level between the two wire ends 34, 35 by making appropriate corrections to the bushing temperature. For example, if glass is not in contact with either wire 34, 35, the bushing set point temperature is lowered at a rate of 2° F. per hour. This causes the level to rise. On the other hand, if both wires are in contact with the glass, the level is too high and the bushing set point temperature is increased at the rate of 2° F. per hour. When only one wire is in contact with the glass, no corrective action is taken.

The circuit diagram of FIGS. 2, 3 and 4 indicate the sequence of operations of the electrical components which accomplish the above functions of the safety and level probes.

In connection with the safety probes, the sequence is as follows during a fall in glass level:

The circuit 37$^a$ through the liquid glass between the bushing terminal 36 and low level probe 32 is broken when the liquid glass level 38 falls below the bottom of probe 32, thereby de-energizing the coil 39 of the low level relay 40 and allowing the normally closed contacts 41 of this relay 40 to close a circuit to the light 42 which indicates low level.

On a rising level, where the liquid glass level 38 makes contact with the high level probe 33, a circuit 43 through the glass 26 between bushing terminal 36 and probe 33 is completed to energize the coil 44 of the high level relay 45, close its normally open contacts 46 and open its normally closed contacts 47. The former set of contacts 46 close a circuit in the light 48 which indicates high level, and the latter set of contacts 47 opens a circuit to the coil 49 of another relay 50. This relay 50 has 2 sets of normally open contacts 51 and 52, and in the high level condition both sets 51 and 52 are in the open position as shown. One set of contacts 51 opens a circuit to the input to the magnetic amplifier 53 which shuts down power to the premelter 10. The other set of contacts 52 opens a circuit to the power supply line 54 to the marble feeder motor 17, shutting it down. Both sets of contacts 51 and 52 of relay 50 are arranged so that they cannot assume the energized condition (both contacts of each set closed) again unless a manual reset latch 55 is manually released. This prevents power flow to the premelter 10 or the synchronous motor 17 powering the marble feeder.

Concerning the level probes 34 and 35, a falling glass level 38 opens the circuit 56 through the liquid glass 26 between the lower probe 35 and bushing terminal 37, thereby de-energizing the coil 57 of the decreasing temperature relay 58, allowing its two sets of contacts 59 and 60 to assume their normally closed position. One set of contacts 59 closes a circuit to a light 61 which indicates LOW LEVEL, the other set 60 energizes a reversible motor 61 in a direction so as to cause a precision potentiometer 62 driven by the motor 61 to change the output E.M.F. of the level controller 63. The level controller 63 comprises a filtered and shielded D.C. power supply 64, having a 115 volt 60 cycle A.C. source 65, and an output of 15 volts positive. This output is applied to the circuit containing three resistors 66 and a fixed condenser 67, fixed resistor terminals 69, the precision potentiometer 62, and output terminals 68.

The output E.M.F. of the level controller 63, is in the order of less than 1 millivolt, or is that E.M.F. corresponding to a temperature of about 10° F. per hour maximum in the Pt-Pt 13% Rh thermocouple calibration tables correlating temperature and E.M.F. The maximum output value of 10° F. per hour is readily adjustable to a value of 2° F. per hour maximum by changing the ohmic value of the resistor 66 connected between the accessible terminals 69.

The output E.M.F. of the level controller 63 across output terminals 68 is in series with a thermocouple 70, the E.M.F. output of which is used to measure the bushing temperature and so control it. The bushing temperature controller 71 changes the bushing temperature by means of its D.C. output to a magnetic amplifier 72. The magnitude of this output is proportional to the difference between the actual temperature of the bushing 22, as detected by the thermocouple 70, in terms of millivolts, and the output of a millivolt source in a temperature reference unit 73 (standard cell or equivalent) in the temperature controller 71, which is manually set by an operator to correspond to the temperature at which it is desired to maintain the bushing. This latter temperature generally is referred to as the "set point." In other words, the output is a signal to the magnetic amplifier 72 of such value as to bring the bushing 22 to the desired temperature, as called for by the "set point," according to conventional temperature control procedures. The temperature controller 71 may comprise, in addition to the temperature reference unit 73, a conventional detector 74 and a current adjusting type controller 75 such as the Leeds & Northrup No. 10877 Current-Adjusting Type Electric Control Unit. The output of the current controller 75 is the same output referred to above as the temperature controller output to the magnetic amplifier 72. The D.C. output of the magnetic amplifier 72 is connected to a saturable reactor 76, and determines the power flow from the 440 volt 60 cycle single phase power mains 77 to the bushing transformer 78.

The output change in E.M.F. of the level controller 63, for the falling level condition, adds voltage to the output of the thermocouple 70 and causes the temperature controller 71 to perform as though the bushing 22 had increased in temperature, i.e., to send out a signal to the magnetic amplifier 72 to reduce the D.C. output to the saturable reactor 76, which reduces the power flow to the bushing transformer 78, in proportion.

A rising glass level will have the opposite effect: that is, a circuit 37$^b$ will be completed through the liquid glass between terminal 37 and probe 34, and the coil 79 of the INCREASING TEMPERATURE RELAY 80 will be energized, closing two sets 81, 82 of normally open contacts. One set of contacts 81 closes a circuit to the light 83 indicating high level, and the other set of contacs 82 energizes the potentiometer 62 and the drive motor 61 opposite to the condition of falling level. This action causes an E.M.F. change in the level controller output which when combined with the bushing thermocouple output has the effect of causing the temperature controller 71 to increase the power flow to the bushing 22, to increase the bushing temperature, increase the flow of glass 26, and reduce the glass level 38 to a point below the probe 34.

A battery symbol has been used to indicate the power supply for each of the relays shown in FIGS. 2 and 3. Actually the power supply is a single rectifier for all relay coils.

With respect to FIG. 5 of the present drawings, strand production of a typical 24 hour bushing operation is there illustrated. As indicated, most spools of wound strand produced during that period were found on weighing to be within about 1% of the average spool weight in grams, which was 1390 grams. This exemplifies the improved C.V. results obtainable by means of the invention.

What is claimed is:

1. The combination with a glass marble feeder, a glass-forming bushing, and means for heating said bushing, of a premelter for receiving and melting glass marbles from the feeder and discharging the melted glass into the bushing, means for heating the premelter separately from and independently of the bushing, said premelter having a limited marble capacity of not substantially in excess of 18 marbles of standard size diameter, and comprising a plurality of heated funnel shaped conical melting cups for selectively and independently receiving and forcing each of the glass marbles making up the limited capacity of the premelter to contact large areas of said heated cups, thus permitting a fast marble melting rate, and a low capacity premelter, and thereby minimizing the holdup of marbles between the marble feeder and the glass-forming bushing.

2. Apparatus for melting glass and forming the same into filaments and strands of improved uniformity comprising in combination a glass marble supply and a glass marble premelter, said premelter having a plurality of funnel shaped conical melting cups, means for heating the premelter, a feeder for moving each of the glass marbles selectively and independently from the supply to the premelter at a predetermined substantially uniform controlled rate, a glass-forming bushing into which the molten glass is discharged from the premelter, and from which it is subsequently extruded in the form of a multiplicity of filaments, means for heating the bushing separately from and independently of the premelter, a rotatable winder for transferring the extruded filaments from the bushing to a spindle, a collecting ring interposed between the bushing and the winder for gathering the multiple extruded filaments into a unitary strand package, and means for controlling the level of the liquid glass in the bushing, said means for controlling the level of the liquid in the bushing comprising a pair of spaced safety probes communicating with the interior of the bushing and means for giving a perdetermined signal if the level is too low or too high, and simultaneously shutting down the feeder and the premelter if the level is too high, said level controlling means further comprising a pair of spaced level probes also communicating with the interior of the bushing to monitor said liquid level of glass and to maintain it within a predetermined satisfactory range, and to signal excessive variations in its position to a level controller, said level controller comprising means for decreasing the temperature of the filament extruding bushing if the glass liquid level is too low and increasing said temperature if the glass liquid level is too high.

3. Apparatus for melting glass and forming the same into filaments and strands of improved uniformity comprising in combination a glass marble supply and a glass marble premelter, said premelter having a plurality of funnel shaped conical melting cups, means for heating the premelter, a feeder for moving each of the glass marbles selectively and independently from the supply to the premelter at a predetermined substantially uniform controlled rate, a glass-forming bushing into which the molten glass is discharged from the premelter, and from which it is subsequently extruded in the form of a multiplicity of filaments, means for heating the bushing separately from and independently of the premelter, a rotatable winder for transferring the extruded filaments from the bushing to a spindle, a collecting ring interposed between the bushing and the winder for gathering the multiple extruded filaments into a unitary strand package, and means for controlling the level of the liquid glass in the bushing, said means for controlling the level of the liquid in the bushing comprising a pair of spaced safety probes communicating with the interior of the bushing and means for giving a predetermined signal if the level is too low or too high, and simultaneously shutting down the feeder and the premelter if the level is too high.

4. Apparatus for melting glass and forming the same into filaments and strands of improved uniformity comprising in combination a glass marble supply and a glass marble premelter, said premelter having a plurality of funnel shaped conical melting cups, means for heating the premelter, a feeder for moving each of the glass marbles selectively and independently from the supply to the premelter at a predetermined substantially uniform controlled rate, a glass-forming bushing into which the molten glass is discharged from the premelter, and from which it is subsequently extruded in the form of a multiplicity of filaments, means for heating the bushing separately from and independently of the premelter, a rotatable winder for transferring the extruded filaments from the bushing to a spindle, a collecting ring interposed between the bushing and the winder for gathering the multiple extruded filaments into a unitary strand package, and means for controlling the level of the liquid glass in the bushing, said means comprising a pair of spaced level probes communicating with the interior of the bushing to monitor said liquid level and to maintain it within a predetermined satisfactory range and to signal excessive variations in its position to a level controller, said level controller comprising means for decreasing the temperature of the filament-extruding bushing if the glass liquid level is too low, and for increasing said temperature of the filament-extruding bushing if the glass liquid level is too high.

References Cited

UNITED STATES PATENTS

| | | | |
|---|---|---|---|
| 2,875,893 | 3/1959 | Russell et al. | 65—1 X |
| 3,248,191 | 4/1966 | Canfield | 65—1 X |
| 3,305,332 | 2/1967 | Roberson et al. | |
| 3,048,640 | 8/1962 | Glaser | 65—2 |

S. LEON BASHORE, Primary Examiner

R. L. LINDSAY, JR., Assistant Examiner

U.S. Cl. X.R.

65—11, 134, 135, 164